June 21, 1949.  G. R. PURIFOY  2,473,903
ELECTRIC CONTROL SYSTEM FOR VEHICLE
RIDE STABILIZING EQUIPMENT
Filed April 23, 1948  2 Sheets-Sheet 1
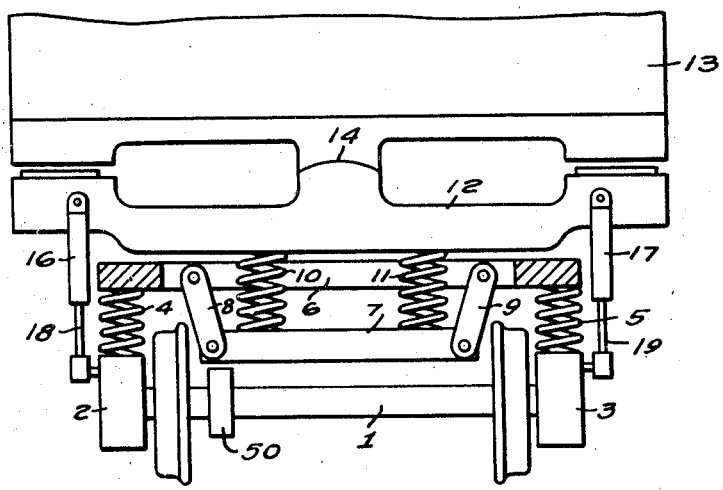
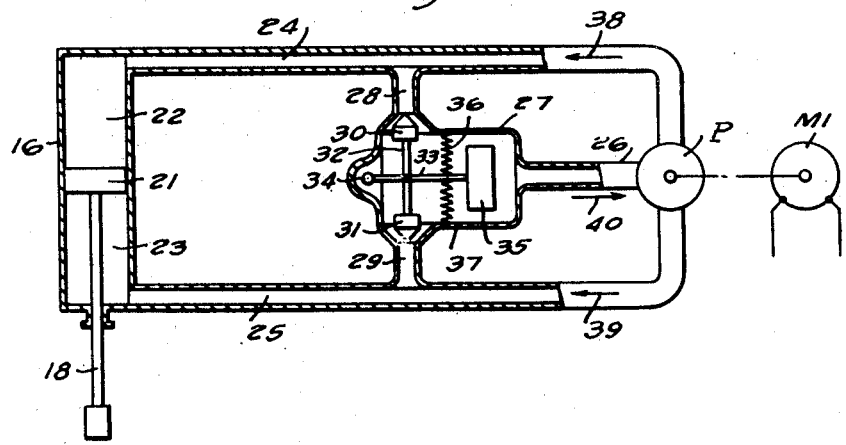
WITNESSES:
INVENTOR
George R. Purifoy.
BY
ATTORNEY

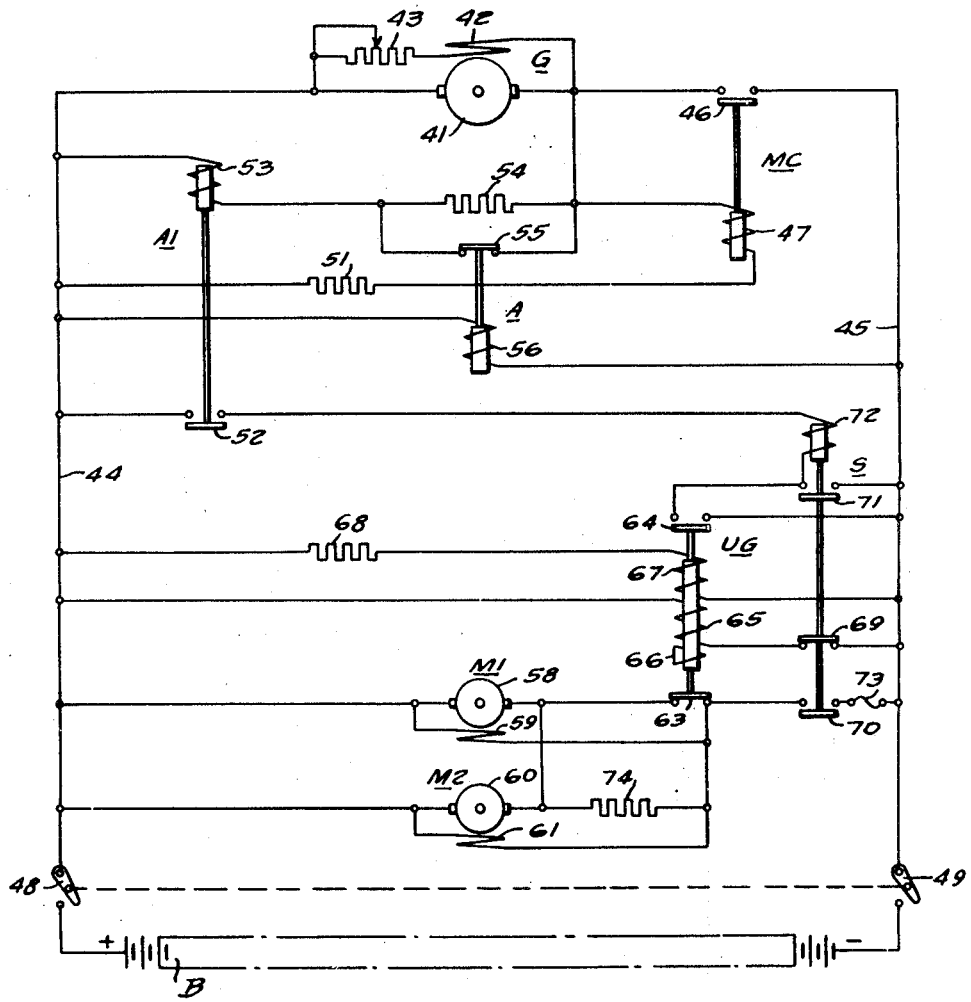

Patented June 21, 1949

2,473,903

UNITED STATES PATENT OFFICE 2,473,903

ELECTRIC CONTROL SYSTEM FOR VEHICLE RIDE STABILIZING EQUIPMENT

George R. Purifoy, Pittsburgh, Pa., assignor to Westinghouse Electric Corporation, East Pittsburgh, Pa., a corporation of Pennsylvania Application April 23, 1948, Serial No. 22,797

5 Claims. (Cl. 318—440)

1

My invention relates to electric control systems for operating auxiliary electric equipment on vehicles from power buses fed from a battery and from a generator. More specifically, my invention concerns energizing control systems for operating the pump or compressor motors of hydraulic ride stabilizers.

It is an object of my invention to provide a battery-and-generator energized electric system for operating the stabilizer pumps or the like motor-driven equipment in such a manner that the load imposed by the equipment on the battery is a minimum while nevertheless a safe and early starting of the equipment is secured at the lowest vehicle speed at which the operation of the equipment becomes desirable. A more specific object of the invention is to devise a system in which the stabilizer pumps or the like equipment cannot impose a drain on the battery when the vehicle is standing still but which causes the motor-driven equipment to commence its operation at a vehicle speed lower than that required for the generator to start feeding the system.

In order to achieve these objects and in accordance with my invention, I provide an electromagnetic relay or contactor which disconnects the pump motor or the like equipment from the power buses of the vehicle when the coil of the contactor is deenergized. I further provide two voltage relays whose respective coils are connected across the generator and are rated to pick up at different generator voltages. One voltage relay has a low pickup voltage, for instance 5 volts, and it causes the control contactor to connect the motor to the power line, then energized only by the battery, when the vehicle speed and generator voltage are too low to permit connecting the generator to the power buses. The second voltage relay is rated to pick up at a higher voltage, for instance, of 30 volts, at which the vehicle speed and generator voltage are sufficient for energization of the power buses by the generator. This second voltage relay then connects the generator to the buses so that the motor is energized from the generator. As a result, no current is drawn by the motor of the stabilizing equipment from the vehicle battery as long as the vehicle is standing still, i. e. as long as no stabilizing performance is required. Nevertheless, the motor starts operating when the vehicle reaches a speed which, though still very low, makes a stabilizing performance desirable. Consequently, the motor-driven equipment imposes a load on the vehicle battery only during

2 relatively short periods of vehicle acceleration and deceleration.

The invention will be more fully understood from the following description in conjunction with the drawings, in which:

Figure 1 shows schematically the truck section of a rail vehicle equipped with hydraulic stabilizers whose pumps are to be operated by a system according to the invention;

Fig. 2 is a schematic diagram of the hydraulic circuit, pump and pump motor appertaining to one of the stabilizing devices of the vehicle; and Fig. 3 represents a circuit diagram of an electric system designed in accordance with the invention for operating the pump motors of the hydraulic stabilizing equipment.

In Fig. 1, an axle and wheel structure of a rail vehicle is denoted by 1. The journals of the axle structure are located at equalizer bars 2 and 3. Each equalizer bar interconnects the two journals located at the same side of the vehicle truck. The bars support vehicle springs 4 and 5. Supported by the springs is a truck frame 6 from which a spring plank 7 is movably suspended by means of swing links 8 and 9. Springs 10 and 11 are mounted on plank 7 and support a bolster 12. The vehicle body 13 is linked to the bolster at 14 by a pivot structure.

The cylinders 16 and 17 of two hydraulic stabilizing devices are linked to the bolster 12. The appertaining piston rods 18 and 19 are linked to the respective equalizer bars 2 and 3. Each stabilizing device forms part of a hydraulic system whose basic design and performance will be understood from the example schematically represented in Fig. 2.

According to Fig. 2, the cylinder 16 of one of the stabilizing devices is equipped with a piston 21 and forms, together with the piston, two pressure spaces 22 and 23, which are in communication with a pump P through respective conduits 24 and 25. The system is filled with liquid, such as oil, and the pump P is composed of two pump units, such as gear pumps, which issue equal amounts of liquid per time unit. The two pump units have a common inlet conduit 26 which opens into the housing 27 of a control device. This device is connected by two ducts or conduits 28 and 29 with the conduits 24 and 25, respectively. Two valves 30 and 31 control the flow resistance or flow area of the communication between the housing 27 and the ducts 24 and 25, respectively. The valves are interconnected by a rigid structure 32 which is linked to an arm 33 pivoted at 34. An inertia weight 35 is mounted on arm 33 and is normally biased toward its center position by springs 36 and 37.

When the inertia weight is in its normal position, the openings controlled by the two valves 30 and 31 have average areas of equal magnitudes. When the pump P is in operation and issues two streams of pressure fluid in the direction of the arrows 38 and 39, the pressures in the cylinder spaces 22 and 23 are equal so that the piston 21 remains at rest. The liquid then circulates from the pump through openings of valves 30 and 31 into the housing 27 and back to the pump through the inlet duct 26 in the direction of the arrow 40. The pump is driven by an electric motor M1.

When the vehicle body 13 and the appertaining bolster 12 are subjected to shocks caused, for instance, by unevenness of the road bed, the hydraulic stabilizing system operates to minimize the undesired vertical movement which such shocks tend to produce. Assume, for instance, that the bolster end to which the cylinder 16 is attached tends to move upward. The hydraulic system, as represented in Fig. 2, or at least the appertaining governing device with housing 27, is mounted on the bolster 12 (Fig. 1). Consequently, the housing 27 (Fig. 2) moves also upward. Due to its inertia, the weight 35 tends to maintain its original position in space, that is, it moves downward relative to housing 27. This causes valve 30 to increase its opening, and valve 31 to decrease its opening. As a result, the pressure in space 22 is decreased, and the pressure in space 23 is increased. The piston 21 is subjected to differential pressure in the upward direction and produces a force which pulls the bolster end and the equalizer bar toward each other, thus counteracting and minimizing the upward movement of the vehicle body. During downward movement of the vehicle body, the hydraulic system is similarly operative to produce a stabilizing effect. Whenever such a stabilizing operation occurs, the stabilizer located at the other side of the truck structure and the stabilizers located at the other truck of the vehicle are simultaneously effective.

It should be understood that the equipment described in the foregoing is presented merely for explanatory purposes and that the invention is not predicated or limited to the design or operation of the particular stabilizing equipment here described. The invention proper concerns the electric control of the pump motor M1 (Fig. 2) or the control of motors to be used on vehicles for operation under conditions comparable to those prevailing with the above exemplified stabilizing system.

In the control system illustrated in Fig. 3, the motor denoted by M1 may consist of the pump motor M1 shown in Fig. 2. The system of Fig. 3 is equipped with another motor M2, which may appertain to the hydraulic system for operating the stabilizing device 17 in Fig. 1. The power system of the vehicle from which the motors M1 and M2 are to be energized is fed from a vehicle battery B and from a generator G whose armature is driven from an axle of the vehicle truck, for instance, from the pulley denoted by 50 in Fig. 1.

The generator armature is denoted by 41 (Fig. 3), the appertaining shunt field winding by 42, and a field rheostat by 43. The generator is connected to buses 44 and 45 under control by the contact 46 of a relay or contactor MC whose coil is denoted by 47. The battery B is also connected across the buses 44 and 45 through the contacts 48 and 49 of a disconnect switch which remains closed when the system is in operative condition.

Coil 47 of relay MC is connected across the generator armature 41 in series with a resistor 51. The relay MC is rated to pick up at the generator voltage at which the generator is supposed to be connected to the buses 44 and 45. As mentioned above, the pickup voltage of relay MC may be 30 volts. Consequently, the generator G is disconnected from the battery and the buses when the vehicle is standing still and also when during accelerating and decelerating periods the vehicle speed is below a given value.

Another voltage relay A1 has a contact 52 controlled by a coil 53 which is connected across the generator armature 41 through a resistor 54. Resistor 54 is normally shorted by the contact 55 of an auxiliary relay A whose coil 56 is connected across buses 44 and 45.

The pickup voltage of relay A1 is much lower than that of relay MC and amounts, for instance, to 5 volts, as mentioned above. Consequently, relay A1 closes its contact 52 when the vehicle starts moving and when its speed is still below that required for the contact MC to cut the generator G into the circuit.

The armature 58 and field winding 59 of motor M1 and the armature 60 and field winding 61 of motor M2, are connected across buses 44 and 45 under control by a timing relay UG and a control relay S. Timing relay UG has contacts 63 and 64 controlled by a main coil 65. In order to provide proper timing, the relay UG is also equipped with a short-circuit winding 66 and a neutralizing winding 67. Winding 67 is connected across buses 44 and 45 in series with a resistor 68. Control relay S has contacts 69, 70 and 71 controlled by a coil 72 whose circuit extends through the above-mentioned contact 52 of voltage relay A1. A fuse is shown at 73 and a starting resistor at 74.

Assume that the vehicle is standing still and that contacts 48 and 49 are closed. The generator voltage is then zero so that both relays MC and A1 are dropped out. Relay S is also dropped out so that its contact 70 interrupts the energizing circuit for motors M1 and M2. Consequently, the pump motors are at rest and draw no load current from the battery B. The main coil 65 of timing relay UG is energized so that contact 63 is open.

When the vehicle starts accelerating, the generator produces an increasing voltage which exceeds 5 volts at a very low vehicle speed. Then, the relay A1 picks up and closes its contact 52. Coil 72 of relay S is now energized through contacts 52 and 64. Relay S picks up and holds itself in by the closing of its contacts 71. At the same time the contact 70 is closed, and coil 65 of timing relay UG is disconnected at contact 69. Contact 70 energizes the motors M1 and M2 in series with the starting resistor 74 so that both motors start running. After the elapse of its timing period, the relay UG drops out and closes the contact 63 so that now the pump motors M1 and M2 are energized at full voltage from the battery B. Consequently, the stabilizing equipment is put into operative condition as soon as a stabilizing performance may become desirable even though the vehicle generator is as yet not in condition to provide sufficient voltage. As soon as the vehicle speed exceeds the value at which the generator voltage is 30 volts, the relay MC picks up and connects the generator to the buses. From then on the pump motors are energized from the generator. As is customary in vehicle power systems, the battery is then charged from the generator through the buses; and the conventional auxiliary relay equipment (not shown) may be provided to disconnect the battery from the buses when fully charged.

Should the generator or bus voltage exceed a safe value, the auxiliary relay A picks up and protects the sensitive voltage relay A1 by inserting the resistor 54 into its coil circuit.

During decelerating periods, the motors M1 and M2 are energized from the battery B as soon as a generator voltage drops below 30 volts, and thereafter they are disconnected from the battery when the car slows down almost to stand still.

The buses of the system shown in Fig. 3 may, of course, also serve purposes other than operating the motor-driven equipment. In particular, the lighting equipment of the car may be connected to the same system.

It will be understood by those skilled in the art that systems according to the invention can be modified and altered as regards individual elements and circuit connections without departing from the objects of the invention and within the essential features set forth in the claims annexed hereto.

I claim as my invention:

1. With hydraulic vehicle stabilizing equipment having a pump motor, in combination, an electric power system comprising buses, a battery normally connected across said buses, an axle generator, a first relay of a given pickup voltage connected across said generator and having contact means disposed between said generator and said buses for energizing said buses from said generator only when the generator voltage is above said pickup voltage, a second relay connected across said generator and having a pickup voltage below said given voltage, and contact means controlled by said second relay and disposed between said pump motor and said buses for connecting said motor across said buses only when said second relay is picked up.

2. With hydraulic vehicle stabilizing equipment having a pump motor, in combination, an electric power system comprising buses, a battery normally connected across said buses, an axle generator, a first relay of a given pickup voltage connected across said generator and having contact means disposed between said generator and said buses for energizing said buses from said generator only when the vehicle speed is above the value at which the generator voltage reaches said pickup voltage, a second relay having a coil connected across said generator and having a pickup voltage lower than that of said first relay so as to pick up at a vehicle speed below said value, a third relay having a coil connected across said buses under control by said second relay and having contact means series-connected with said motor across said buses so as to energize said motor from said buses only when said second relay is picked up.

3. With motor-driven vehicle equipment, in combination, an electric power system comprising buses, a battery normally connected across said buses, a generator, a first relay of a given pickup voltage connected across said generator and having contact means for connecting said generator across said buses when the generator voltage is above said pickup voltage, a second relay connected across said generator and having a pickup voltage below said given voltage, and contact means controlled by said second relay and disposed between said pump motor and said buses for connecting said motor across said buses only when said second relay is picked up.

4. With motor-driven vehicle equipment, in combination, an electric power system comprising buses, a battery normally connected across said buses, a generator, a first relay of a given pickup voltage connected across said generator and having contact means for connecting said generator across said buses when the generator voltage is above said pickup voltage, a second relay having a coil circuit connected across said generator and having a pickup voltage below said given voltage, contact means controlled by said second relay and disposed between said pump motor and said buses for connecting said motor across said buses only when said second relay is picked up, a resistor series-connected in said coil circuit, and another relay having a normally closed contact connected across said resistor and having a coil connected across said buses, said other relay having a pickup voltage above the normal voltage range of the system.

5. A motor control system, comprising a motor, a pair of buses, a battery normally connected across said buses, a generator, a first relay of a given pickup voltage connected across said generator and having contact means for connecting said generator across said buses when the generator voltage is above said pickup voltage, a second relay having a coil connected across said generator and having a pickup voltage lower than that of said first relay, and a third relay having a coil connected across said busses under control by said second relay and having contact means series-connected with said motor across said buses so as to energize said motor from said buses only when said second relay is picked up.

GEORGE R. PURIFOY.

No references cited.